United States Patent
Fleischman et al.

(10) Patent No.: US 10,333,711 B2
(45) Date of Patent: Jun. 25, 2019

(54) CONTROLLING ACCESS TO PROTECTED OBJECTS

(75) Inventors: Eric Fleischman, Redmond, WA (US); Tarek Kamel, Issaquah, WA (US); Yordan Rouskov, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 770 days.

(21) Appl. No.: 13/162,831

(22) Filed: Jun. 17, 2011

(65) Prior Publication Data
US 2012/0321087 A1 Dec. 20, 2012

(51) Int. Cl.
*H04L 9/32* (2006.01)

(52) U.S. Cl.
CPC .......... *H04L 9/3213* (2013.01); *H04L 9/3231* (2013.01); *H04L 9/3234* (2013.01)

(58) Field of Classification Search
CPC ......... H04L 9/08; H04L 9/083; H04L 63/062; H04L 9/3213; H04L 9/3231; H04L 9/3234
USPC ............................... 726/10, 26–29; 380/277
See application file for complete search history.

(56) References Cited

U.S. PATENT DOCUMENTS

| | | | | |
|---|---|---|---|---|
| 5,495,533 A * | 2/1996 | Linehan et al. | | 713/155 |
| 5,799,086 A * | 8/1998 | Sudia | | 705/76 |
| 2001/0050990 A1* | 12/2001 | Sudia | | 380/286 |
| 2002/0107806 A1* | 8/2002 | Higashi | | G06F 21/10 |
| | | | | 705/51 |
| 2003/0149871 A1* | 8/2003 | Medvinsky | | 713/155 |
| 2006/0021018 A1* | 1/2006 | Hinton et al. | | 726/10 |
| 2008/0077982 A1 | 3/2008 | Hayler et al. | | |
| 2008/0313264 A1* | 12/2008 | Pestoni | | 709/202 |
| 2009/0055642 A1 | 2/2009 | Myers et al. | | |
| 2009/0217056 A1 | 8/2009 | Malpani | | |
| 2010/0211781 A1 | 8/2010 | Auradkar et al. | | |
| 2010/0303230 A1* | 12/2010 | Taveau et al. | | 380/30 |
| 2010/0325424 A1* | 12/2010 | Etchegoyen | | 713/155 |
| 2010/0325703 A1* | 12/2010 | Etchegoyen | | 726/5 |
| 2011/0213962 A1* | 9/2011 | Pestoni | | 713/156 |

OTHER PUBLICATIONS

Guan; et al., "SAFE: Secure Agent roaming for E-Commerce"—Published Date: 2002 http://bura.brunel.ac.uk/bitstream/2438/1095/1/SAFE%20%20Secure%20Agent%20roaming%20For%20E-Commerce.pdf.

(Continued)

*Primary Examiner* — Tamara T Kyle
(74) *Attorney, Agent, or Firm* — Buckley, Maschoff & Talwalkar LLC

(57) ABSTRACT

A device operated by a user may store an object to which access is to be regulated, which may be achieved by encrypting the object with an encryption key and sending the key to a server having a key store. When a user of the device requests access to the object, the server may authenticate the user (e.g., according to a credential submitted by the user) and verify a trust identifier of the device (e.g., authorization to access the object through the device, and/or the integrity of the device), before sending to the device a ticket granting access to the key. The device may send the ticket to the server, receive the key from the server, decrypt the stored encrypted object, and provide the object to the user. This mechanism promotes rapid access upon request and efficient use of the server, and enables remote revocation of access.

20 Claims, 8 Drawing Sheets

(56) References Cited

OTHER PUBLICATIONS

Chow; et al., "Controlling Data in the Cloud: Outsourcing Computation without Outsourcing Control"—Published Date: 2009, http://www.parc.com/content/attachments/ControllingDataInTheCloud-CCSW-09.pdf.

Santos; et al., "Towards Trusted Cloud Computing"—Published Date: 2010 http://www.mpi-sws.org/~gummadi/papers/trusted_cloud.pdf.

Gustafson; et al., "Securely Available Credentials—Credential Server Framework"—Published Date: 2004 http://cabernet.levkowetz.com/pdf/draft-ietf-sacred-framework-06.pdf.

* cited by examiner

CONTROLLING ACCESS TO PROTECTED OBJECTS

BACKGROUND

Within the field of computing, many scenarios involve the securing of objects stored by a device (such as a computer) that represent sensitive information, such as a security credential authenticating a user, a financial account, or a confidential document. Such objects may be secured by encrypting the objects with a key, such as a password or a key pair in an asymmetric encryption protocol, and stored on the device in a data store. The objects may then be decrypted only upon a valid request of a user who is in possession of the key, and may be unusable to other users (e.g., an unauthorized individual who gains access to the encrypted object is unable to use it without possession of the key).

Another technique for securing the object involves the mediation of a server. For example, a server may store an object representing sensitive information, and may provide the object only when a user is properly authenticated (e.g., by submitting a username and password), and when the authenticated user is identified as authorized to access the object.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Presented herein are techniques for providing access to an object in a secured manner. In accordance with these techniques, the object is stored on a device of the client, but is encrypted with a key stored on a server that mediates access to the object as requested by a device operated by the user. When a user of the device requests access to the object, the server endeavors to authenticate the user and to verify a trust identifier of the device (e.g., that the device is trusted by the user). For example, the device may submit one or more authenticating credentials of the user, and a credential asserting that the user has established a suitable trust identifier with the device. If the user is authenticated and the device has a sufficient trust identifier, the server generates and sends to the device a ticket that grants access to the key. The device may then present the ticket to the server to request access to the key, and the server may, upon validating the ticket, send the key to the device. The device may use the key to decrypt the encrypted object, and may therefore grant access to the object (in an unencrypted form), in accordance with the properties of the key (e.g., the duration wherein the key is valid). When the ticket expires or is determined to be invalid, the device may dispose of the ticket and the unencrypted object, and may refuse to grant access to the user to the object until and unless a credential that again authenticates the user and an indication of a sustained trust identifier are provided (wherein another valid ticket may be issued). In this manner, the server verifies that the object is accessible only to an authenticated user who is permitted to access the object on a trusted device. Moreover, the generation and exchange of tickets may enable the persistence of the authentication and verification for a period of time, while also permitting the server to revoke access to the object by refusing to reissue an expired ticket.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
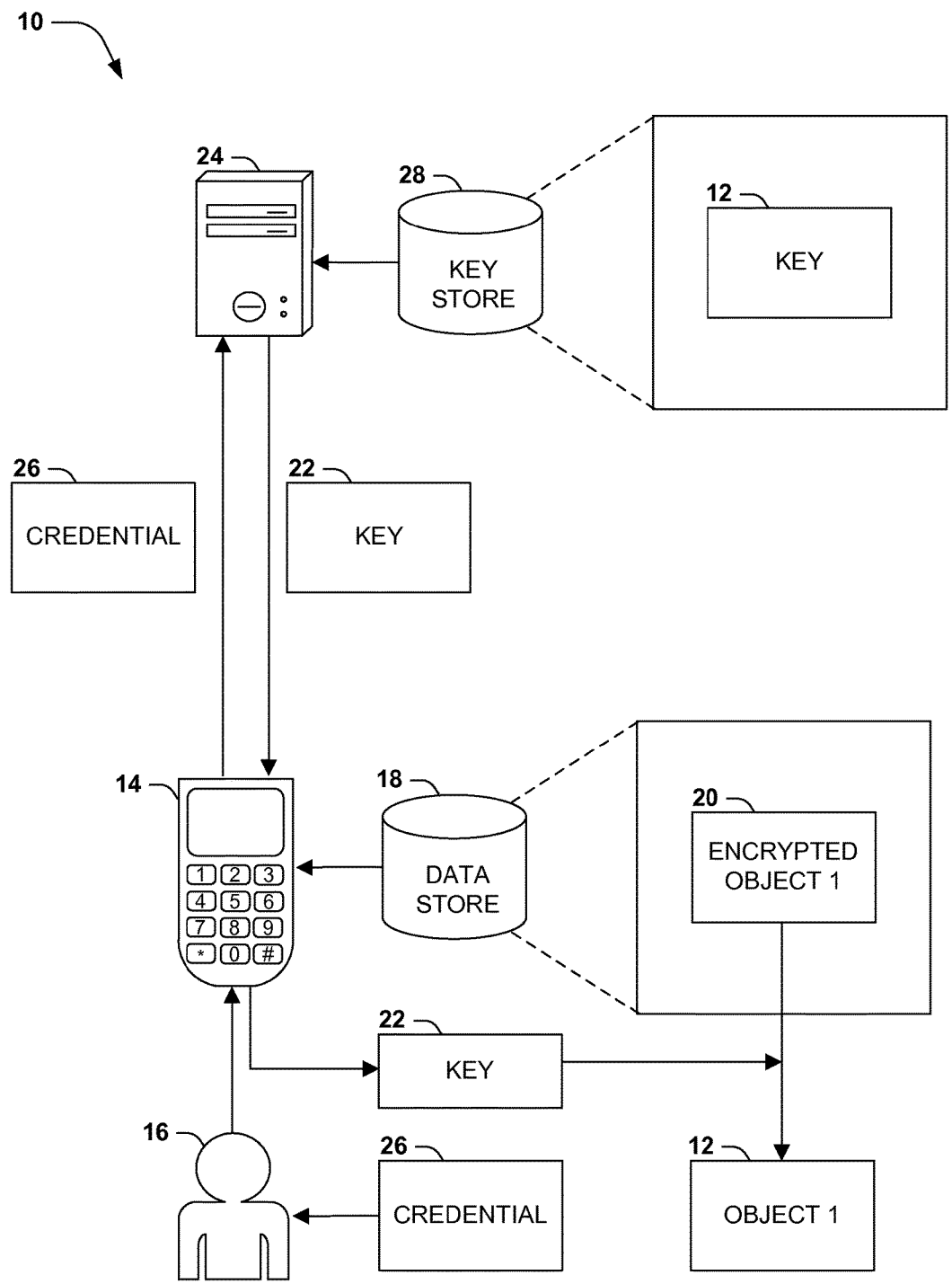
FIG. 1 is an illustration of an exemplary scenario featuring two mechanisms for securing access to an object requested by a device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve an object representing sensitive information to which access is to be limited. For example, an object may comprise information that may be used to authenticate an individual, such as an identity cookie, an authentication certificate, or a login and password combination; information comprising a financial, medical, or otherwise sensitive account; or a document that has been provided to a user under confidentiality. A user of a device (such as a computer) may seek to access the object, and/or to permit other authorized users to access the object, and may also to have the object shared among two or more devices operated by the user. However, the user may also seek to restrict access from unauthorized users. Such unauthorized access might include, e.g., attempts by other users of the device to access the object through the file system of the device; a theft or intrusion of the device and an attempt to extract data stored on the device; and eavesdropping upon communication with the device that includes the information contained in the object.

The security of and access to such sensitive objects may be regulated in many ways. FIG. 1 presents an exemplary scenario 10 illustrating two mechanisms whereby an object 12 may be accessed by a device 14 operated by a user 16. In this exemplary scenario 10, the user 16 is authorized to access a first object 12 and a second object 12, but seeks to secure the objects 12 from unauthorized accesses by other users 16. According to a first security mechanism, the first object 12 may be stored in a data store 18 of the device 14, but may be stored as an encrypted object 20 that has been encrypted with a key 22. Many types of keys 22 featuring many types of encryption mechanisms may be utilized, such as a symmetric encryption key (e.g., a password) that is used both to encrypt and decrypt the first object 12; an asymmetric public/private key pair, comprising a public key that is used to encrypt the first object 12 to generate the encrypted object 20 and a private key that is securely possessed by the user 16 is used to decrypt the encrypted object 20 to reconstitute the first object 12; or a mask utilized in a one-time-pad mechanism that extracts the data comprising the first object 12 from among random data included in the encrypted object 20. The encrypted object 20 generated from the object 12 and the key 22 may be safely stored in the data store of the device 18, because unauthorized users (e.g., other authorized users of the device 14 and a thief or intruder who attempts to extract data from the device 14) cannot make use of the encrypted object 20 without possessing the key 22. The user 16 may request to access the first object 12 by providing the key 22 to the device 14 (e.g., providing a private key or inputting a password) and allowing the device 14 to use the key 22 to decrypt the encrypted object 20 in order to regenerate and present to the user 16 the first object 12.

FIG. 1 also illustrates a second mechanism for securing access to a second object 12. In this exemplary scenario 10, a second object 12 is stored in a data store 18 of the device 14, but the key 22 for the second object 12 is stored in a key store 28 of a server 24 that is configured to manage access to the second object 12. The server 24 may store information that authorizes access to the second object 12 by a user 16 associated with a particular credential 26, such as a username and password combination, an authentication certificate, or a biometric measurement. A user 16 of a device 14 may request access to the second object 12, and may also submit a credential 26 in the possession of the user 16 (e.g., a password entered into an input component of the device 14, an authentication certificate provided to the device 14, or a biometric measurement captured by a biometric sensor of the device 14), and the device 14 may contact the server 24 with the request and the credential 26. The server 24 may verify that the user 16 represented by the credential 26 is authorized to access the second object 12, and may then send the key 12 for the second object 12 to the user 16. In this manner, the server 24 may participate in the regulation of access to the second object 12.

While the mechanisms illustrated in the exemplary scenario 10 of FIG. 1 may promote access security of the objects 12, the exemplary scenario 10 also identifies some disadvantages of such techniques. As a first example, both techniques may leave the device 14 in possession of an unencrypted version of an object 12 that may be stored or persistently accesses for a long period of time, thereby reducing the security of the object 12. That is, an object 12 decrypted on the device 14 may remain in a persistent state for a long time, thereby circumventing the access security mechanisms. For example, the user 16 may wish to revoke access to the object 12 through the device 14 and/or by the user 16, but these mechanisms provide no such capability. As a second example, while it may be advantageous to involve a server 24, the usage of the server 24 involves providing the credential 26 during each request to access an object 12. If many objects 12 are to be accessed by the device 14, or if the same object 12 is to be accessed many times (e.g., a database table into which many rows are to be inserted), the frequent submission and reexamination of the credential 26 for each access may consume a significant amount of computing resources (e.g., network capacity in exchanging the credential 26 and processing power of the server 24 in verifying the credential 26), and/or may significantly protract the amount of time involved in accessing the object(s) 12. As a third example, it may be inefficient to couple the provision of an object 12 by the server 24 to a device 14 with the receipt of a request therefore. For example, the object 12 to be accessed may be very large, and transmitting the object 12 at the time of the request may result in unsatisfactory performance. As a fourth example, while the server 24 evaluates the credential 26 identifying the user 16, it does not evaluate any aspect of the device 14, which may have compromised components, may have been stolen or impersonated, or may simply be unauthorized for accessing the object 12 (e.g., an owner of the object 12 may seek to restrict the provision of the objects 12 by the server 16 only to known and trusted device 14, and not to other devices, such as publicly accessible terminals).

Presented herein are techniques for regulating access to an object 12 provided by a server 24 having a key store 28 that may address these deficiencies of the mechanisms presented in the exemplary scenario 10 of FIG. 1. In accordance with these techniques, a device 14 storing an object 12 to which access is to be regulated may encrypt the object 12 with a key 22, and may send the key 12 to a server 24 for storage in a key store 28. The server 24 may regulate access to the object 12 by regulating access to the key 22. For example, when a user 16 requests access to the object 12, the server 24 may, after verifying the authorization of the request, provide the key 22 to the device 14. Additionally, the provision of the key 22 may be conditioned not only on the submission of a credential 26 identifying the user 16, but upon an examination of a trust identifier of the device 14 upon which the user 16 has requested access to the object 12. For example, the object 12 may be authorized for provision only to specific devices 14 that are trusted by an owner of the object 12, and/or that satisfy a device integrity check demonstrating that the device 14 has not been compromised (e.g., an examination of the system resources to determine tampering). This verification may involve a significant expenditure of time and/or computational resources of the server 24 and/or the device 14, but this expenditure may be reduced (particularly for repeated access to the object 12 or to multiple objects 12) by utilizing a ticketing mechanism, whereby the server 24 issues a ticket to the device 14 indicating a grant of access to the key 22. The device 14 may then submit the ticket in order to achieve access to the key 22, thereby resulting in a reduced evaluation of subsequent requests. The ticket may also be restricted in some manner (e.g., having a specified valid duration or number of uses, or restricted to a particular device 14), thereby enabling a revocation of access.

Figure 2:
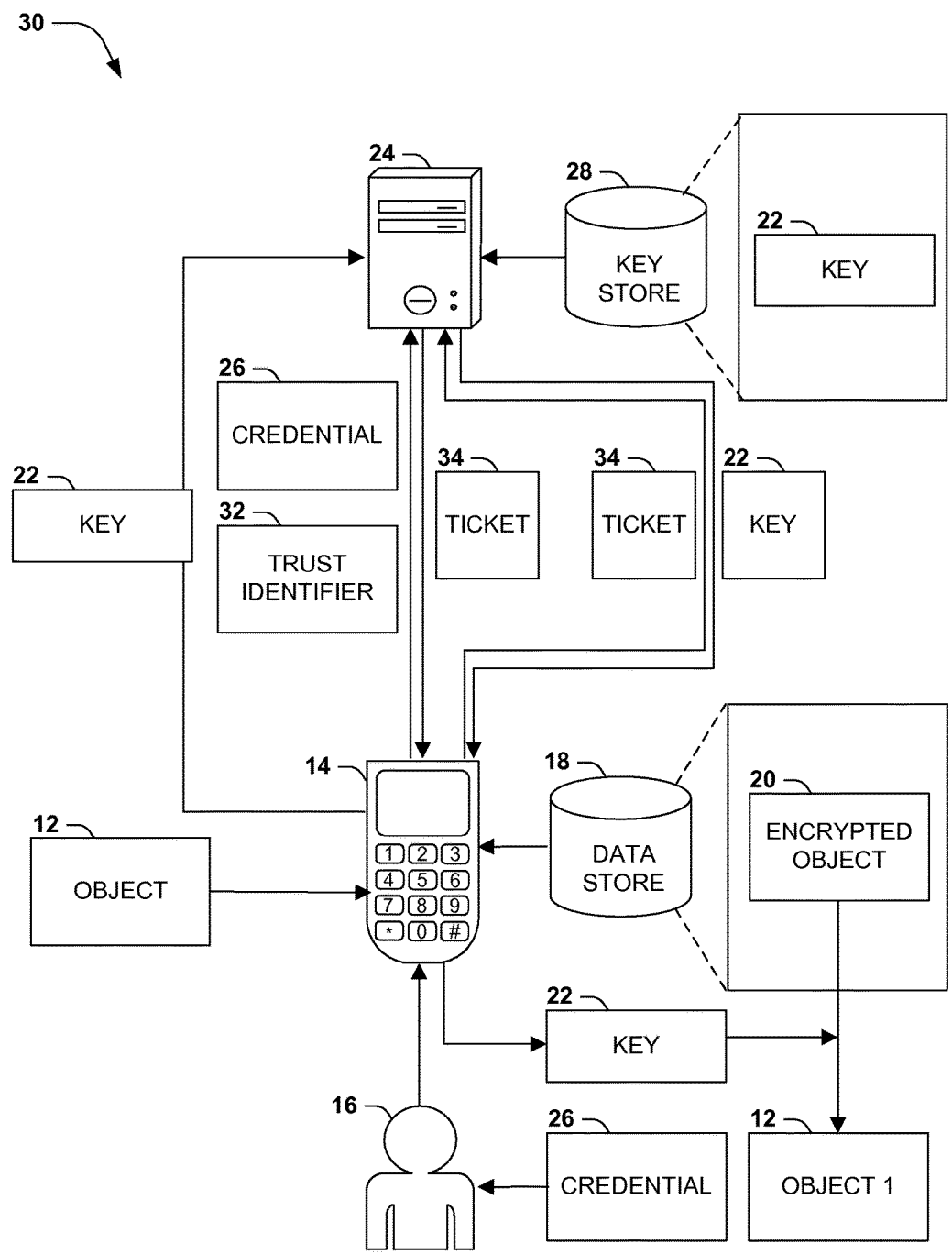
FIG. 2 is an illustration of an exemplary scenario featuring a provision of an encryption key for an object by a server to a device in response to a request from a user of the device in accordance with the techniques presented herein.

FIG. 2 presents an exemplary scenario 30 featuring the provision by a server 24 of a key 22 for an object 12 stored by a device 14 in accordance with the techniques presented herein. In this exemplary scenario 30, a device 14 comprises a data store 18 that stores an object 12, and a user 16 of the device 14 may, at some point in time, seek to access the object 12. However, this access is regulated by a server 24 comprising a key store 28 storing a key 22 with which the object 12 has been encrypted. When a user 16 requests access to the object 12, the device 14 may submit to the server 24 at least one credential 26 of the user 16, and also at least one trust identifier 32 of the device 14. The server 24 may receive the at least one credential 26 and the at least one trust identifier 32, and may authenticate the user 16 requesting the object 12 (e.g., the identity of the user 16 and/or the authorization of the user 16 to access the object 12) and verify the at least one trust identifier 32 of the device 14 (e.g., the authorization to access the object 12 through the device 14, and/or the device integrity of the device 14). Upon authenticating the user 16 and verifying the trust identifier 32, the server 24 may generate a ticket 34 granting access to the key 22, and may send the ticket 34 to the device 14. The device 14 may receive and store the ticket 34. The device 14 may also submit the ticket 34 to the server 24 to request the key 22. Upon receiving and verifying the ticket 34, the server 24 may send the key 22 to the device 14, and the device 14 may use the key 22 to decrypt the encrypted object 20 stored in the data store of the device 18 and present the object 12 to the user 16.

The techniques illustrated in the exemplary scenario 30 of FIG. 2 may present one or more advantages (particularly in comparison with the mechanisms illustrated in the exemplary scenario 10 of FIG. 1). As a first example, because the device 14 stores an encrypted object 20 but does not store the key 22 for the encrypted object 20, a security breach of the device 14 (e.g., theft of the device 14 or the storage of the device 14) does not yield access to the object 20 if the server 24 does not provide the key 22; e.g., the server 24 may be instructed to dispose of the key 22 for the encrypted object 20 once the device 12 is identified as having been stolen. As a second example, the ticket 34 generated by the server 24 and sent to the device 14 may represent a successful authentication of the user 16 and/or a verification of the trust identifier 32 of the device 14. Accordingly, the ticket 34 may be repeatedly submitted by the device 14 to obtain repeated access to the key 22 for an object 12 (or to one or more keys 22 granting access to one or more objects 12 that are regulated according to the same authorization and trust identifier verification), thereby expediting the delivery of keys 22 for multiple requests following a successful user authentication and trust identifier verification. As a third example, the use of a ticket 34 may enable a revocation of access; e.g., the ticket 24 generated by the server 24 may only be valid for a particular period, for a particular number of uses, and/or for access by a particular device 14, and if the ticket 34 is invalidated, a reexamination of the access permissions and trust identifier 32 of the device 14 may result in a revocation of access if the permissions so extended have changed in the interim. These and other advantages may be achieved through the use of the techniques presented herein.

Figure 3:
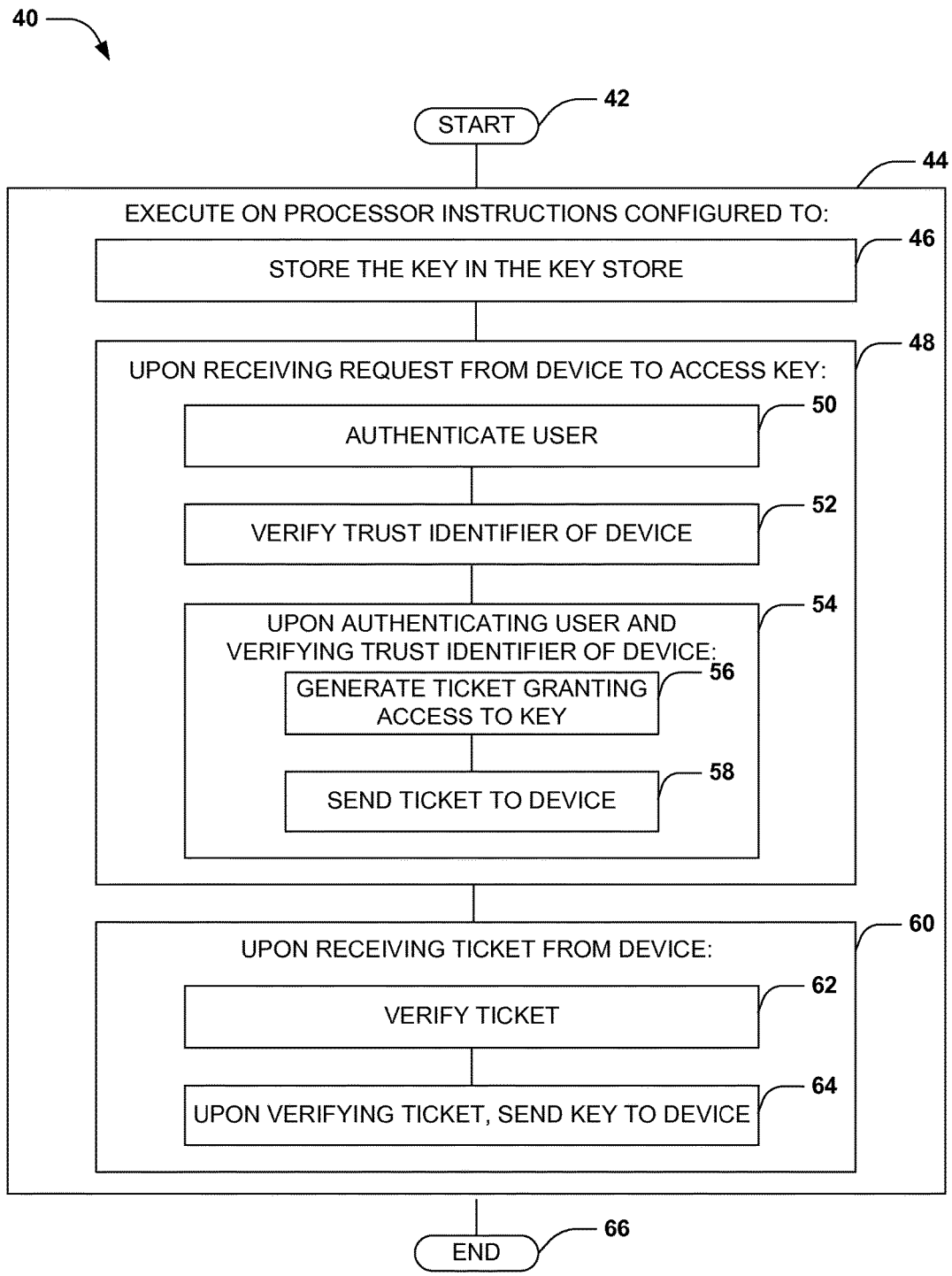
FIG. 3 is a flow chart illustrating an exemplary method of configuring a server to provide encryption keys for objects to a device in response to a request by a user in accordance with the techniques presented herein.

FIG. 3 presents a first embodiment of these techniques, illustrated as an exemplary method 40 of configuring a server 24 having a key store 28 to regulate access to an object 12 stored on a device 14 operated by a user 16. The exemplary method 40 may be implemented, e.g., as instructions stored in a memory component of the server 24 (e.g., a memory circuit, a platter of a hard disk drive, a solid-state storage component, or a magnetic or optical disc) that, when executed on a processor of the server 24, perform the techniques presented herein. The exemplary method 40 begins at 42 and involves executing 44 the instructions on the processor of the server 24. In particular, the instructions are configured to store 46 the key 22 for at least one object 12 in the key store 28. The instructions are also configured to, upon receiving 48 a request from the device 14 to access the key 22, authenticate 50 the user 16 (e.g., by receiving and examining a credential 26 submitted by the user 16), and verify 52 a trust identifier 32 of the device 14 (e.g., examining a trust identifier 32 submitted by the device 14 indicating the identity of the device 14, such as a device ID that may be compared to a list of device IDs that are authorized to access the object 12, and/or indicating a component integrity of one or more device components of the device 14). Upon authenticating 54 the user 16 and verifying the trust identifier 32 of the device 14, the instructions are configured to generate 56 a ticket 34 granting access to the key 22, and send 58 the ticket 34 to the device 14. The instructions are also configured to, upon receiving 60 the ticket 34 from the device 14, verify 62 the ticket 34, and upon verifying the ticket 34, send 64 the key 22 to the device 14. In this manner, the instructions may enable a server 24 to provide an object 12 to a device 14 and a user 16 according to the techniques presented herein, and so ends at 66.

Figure 4:
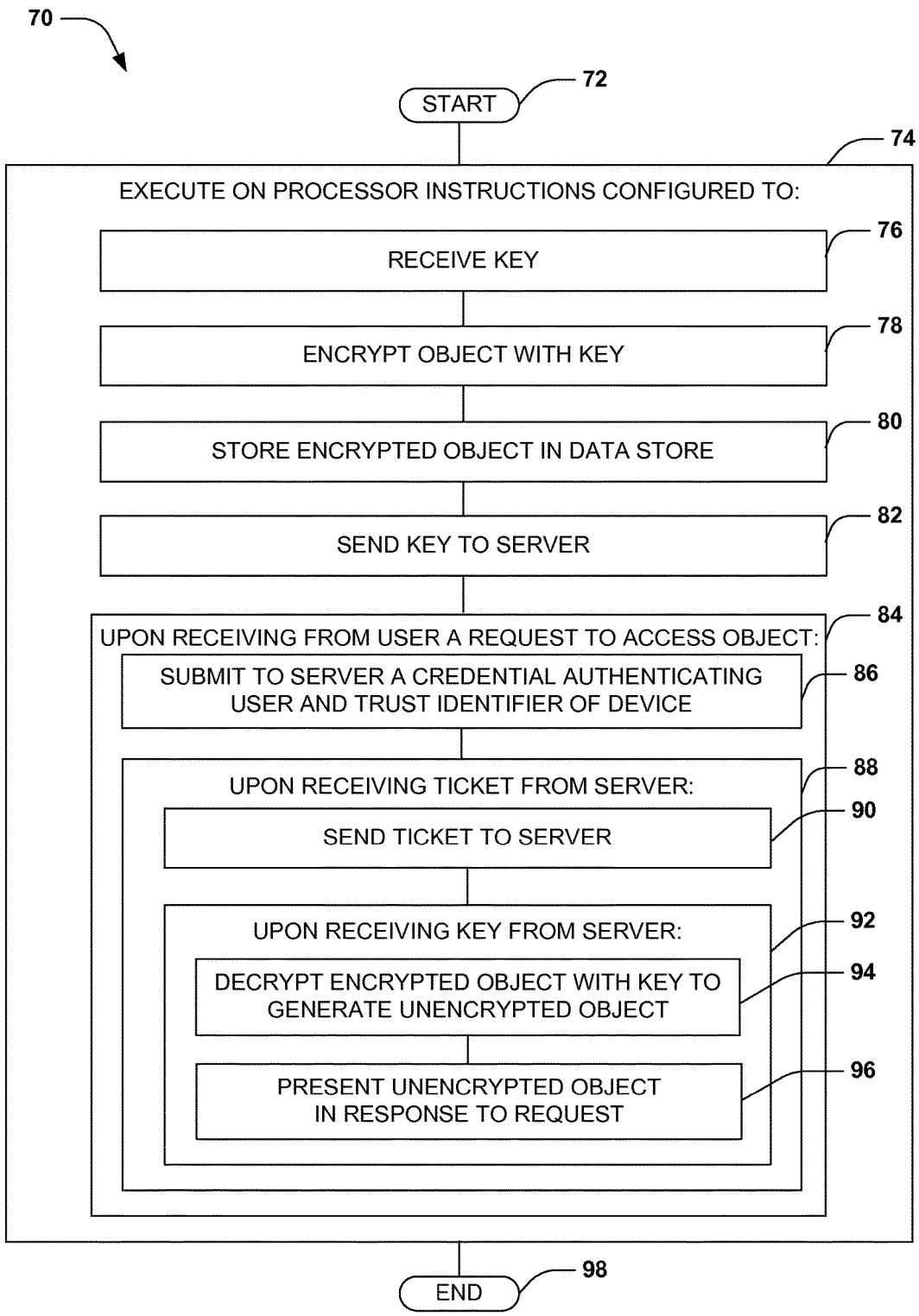
FIG. 4 is a flow chart illustrating an exemplary method of configuring a device to request encryption keys for objects from a server in response to a request by a user in accordance with the techniques presented herein.

FIG. 4 presents a second embodiment of these techniques, illustrated as an exemplary method 70 of configuring a device 14 to access objects 12 provided by a server 24. The device 14 is operated by a user 16, and comprises a processor and a data store 18 (e.g., a memory circuit, a platter of a hard disk drive, a solid-state storage component, or a magnetic or optical disc) wherein respective objects 12 may be stored. The exemplary method 70 may be implemented, e.g., as a set of instructions stored in a memory component of the device 14 (such as the data store 18) that, when executed on a processor of the device 14, cause the device 14 to perform the techniques presented herein. The exemplary method 70 begins at 72 and involves executing 74 the instructions on the processor of the server 24. In particular, the instructions are configured to receive 76 a key 22, and to encrypt 78 the object 12 with the key 22 to generate an encrypted object 20. The instructions are also configured to store 80 the encrypted object 20 in the data store 18, and send 82 the key 22 to the server 24. The instructions are also configured to, upon receiving 84 a request from the user 16 to access the object 12, submit 86 to the server 24 at least one credential 26 authenticating the user 16, and a trust identifier 32 of the device 14. The instructions are also configured to, upon receiving 88 a ticket 34 from the server 24, send 90 the ticket 34 to the server 24. The instructions are also configured to, upon receiving 92 a key 22 from the server 24, decrypt 94 the encrypted object 20 with the key 22 to generate an unencrypted object 12, and present 96 the unencrypted object 12 in response to the request. In this manner, the exemplary method 80 enables a device 14 to regulate access to objects 12 through the provision of keys 22 by a server 24 in response to requests from the user 16 and in a secure manner, and so ends at 102.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
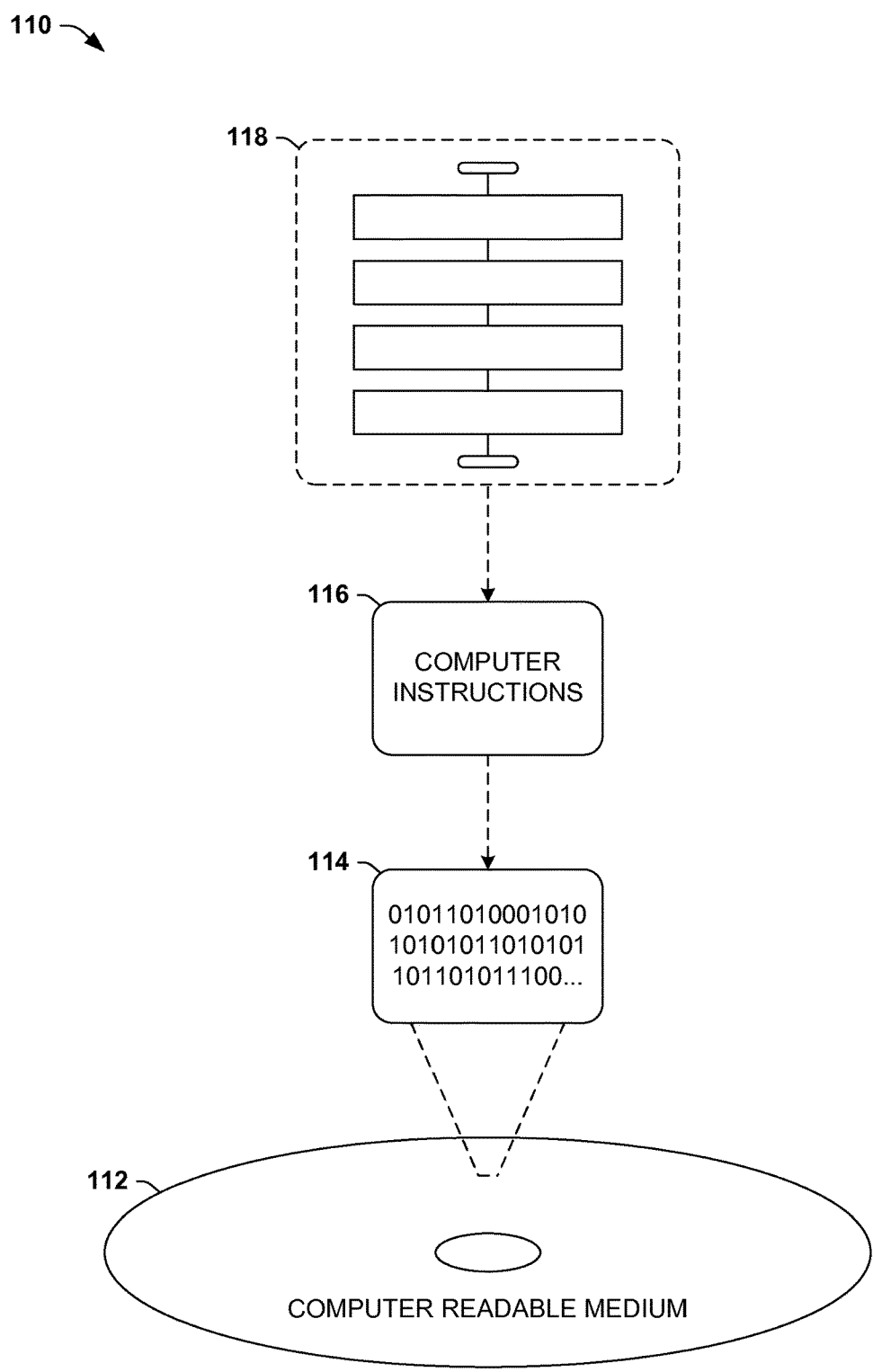
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 110 comprises a computer-readable medium 112 (e.g., a CD-R, DVD-R, or a platter of a hard disk drive), on which is encoded computer-readable data 114. This computer-readable data 114 in turn comprises a set of computer instructions 116 configured to operate according to the principles set forth herein. In one such embodiment, the processor-executable instructions 116 may be configured to perform a method of #Q, such as the exemplary method 40 of FIG. 3. In another such embodiment, the processor-executable instructions 116 may be configured to implement a system for #Q, such as the exemplary method 80 of FIG. 4. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 40 of FIG. 3 and the exemplary method 80 of FIG. 4) to confer individual and/or synergistic advantages upon such embodiments.

A first aspect that may vary among embodiments of these techniques relates to the scenarios wherein such techniques may be utilized. As a first example, the server 24 may comprise a software and/or hardware component of the device 14 that is configured to store keys 22 for sensitive objects 12 and provide access by the device 14 thereto. Alternatively, the server 24 may comprise a separate device, such as a computer, that is accessible by the device 14 over a network or other communication mechanism. As a second example of this first aspect, these techniques may enable the regulation of access to many types of objects 12, such as files in a file system, records in a database, or objects in an object system. As a third example of this first aspect, many types of encryption techniques and keys 22 may be used to encrypt and/or decrypt the objects 12, such as a symmetric encryption technique involving a password, an asymmetric encryption technique involving a public/private key pair, and a one-time-pad encryption technique involving a mingling of the data comprising an object 12 with unrelated or random data and (as a key 22) a mask applied to the mixed data set to identify the data comprising the object 12. As a fourth example of this first aspect, the keys 22 may be generated by the device 14 and sent to the server 24; may be generated by the server 24 and sent to the device 14 for encrypting the objects 12; and/or a combination thereof. As a fifth example of this first aspect, these techniques may be utilized to regulate access to a particular object 12, or to a set of objects 12 having a similar set of access regulations. Such objects 12 may be encrypted and/or decrypted with one or more keys 22 (e.g., one key 22 may be used to encrypt several objects 12 that are accessible under the same circumstances, or different keys 22 may be used to encrypt respective objects 12). Additionally, a ticket 34 may permit access to the key(s) for a set of objects 12 that are authorized for access by the authenticated user 16 and the verified device 14. Those of ordinary skill in the art may devise many such scenarios wherein the techniques presented herein may be utilized.

A second aspect that may vary among embodiments of these techniques relates to the authentication of a user 16. As a first example, a credential 26 submitted by a user 16 may be self-authenticating; e.g., an identifier of the user 16 may be digitally signed using a private key that is only in the possession of the user 16 that may be verified against a public key of the user 16. Alternatively, the server 24 may be configured to store at least one credential 26 of the user 16, and a submitted credential 26 received from a user 16 may be verified by comparison with the credential stored for the user 16 by the server 24 (e.g., storing a correct password that authenticates a user 16, and authenticating a user 16 by comparing a submitted password with the stored password for the user 16). As a second example of this second aspect, many types of credentials 26 may be utilized to identify a user 16. Such credentials 26 may be selected from a credential set 26, such as a secret known by the user 16 (e.g., a password), a token possessed by the user 16 (e.g., a number provided by a fob that generates an unpredictable but verifiable sequence of numbers at different times), a contact identifier whereby the user 16 may be contacted (e.g., authenticating the user 16 by contacting the user 16 at a known contact identifier, such as an email address or a telephone number, and receiving a confirmation of the user 16 from the contact identifier), or a biometric identifier that identifies at least one physiological feature of the user 16 (e.g., a fingerprint compared with known traits of the user 16).

As a third example of this third aspect, the device 14 may simply receive a credential 26 from the user 16 (e.g., an entered password or a cryptographically signed message), and may simply send the credential 26 to the server 24. As a first alternative, the device 14 may not be involved in the authentication of the user 16; e.g., the server 24 may contact the user 16 via a different device (e.g., at a telephone number). As a second alternative, the device 14 may participate in the authentication of the user 16; e.g., the device 14 may comprise a biometric sensor that is configured to detect at least one biometric of a user 16, and the credential 26 authenticating the user 16 may comprise a biometric identifier that is stored by the server 24 and that represents a physiological aspect of the user 16. Accordingly, the device 14 may participate in the authentication of a user 16 by using the biometric sensor to detect at least one biometric of the user 16, and by submitting the detected biometric to the server 24 for comparison with a corresponding biometric identifier of the user 16. Additionally, it may be advantageous to request, submit, and/or evaluate multiple credentials 26, such as in a two-factor authentication model where two different types of credentials 26 are provided by the user 16. Those of ordinary skill in the art may devise many ways of authenticating the user 16 while implementing the techniques presented herein.

A third aspect that may vary among embodiments of these techniques relates to the manner of verifying one or more trust identifiers 32 of a device 14. The trust identifiers 32 of the device 14 generally indicate that the device 14 is entrusted to access the object 12 by the user 16, the server 24, and/or the object 12. As a first example, many types of trust identifiers may be utilized that identify different aspects of the trust of the device 14. As a first such variation, the trust identifier 32 may indicate that the object 12 is authorized for transmission to the particular device 14. For example, an owner of an object set (or the server 24 storing the object set) may restrict the release of the objects 12 only to a particular set of devices 14, such as those that are under the control of the owner or that are known to be secure from intrusion. The owner may therefore delegate trust identifiers 32 to devices 14 that are authorized to access the objects 12. Accordingly, the device 14 may comprise a device identifier that identifies the particular device 14 (e.g., a specific device 14, a product model of the device 14, a general type or class of device 14, or a configuration or capability of the device 14), and the device 14 may submit the device identifier as a trust identifier 32 for evaluation by the server 24. As a second such variation, the trust identifier 32 may indicate the configuration of various device components of the device 14, and may be submitted as evidence that the device 14 has not been tampered with or corrupted. For example, the device 14 may submit to the server 24 a set of trust identifiers 32 respectively representing the presence, nature, and configuration of various device components of the device 14, and the server 24 may examine the trust identifiers 32 to confirm that the device 14 remains secure and that the device integrity of the device 14 has not been compromised.

Figure 6:
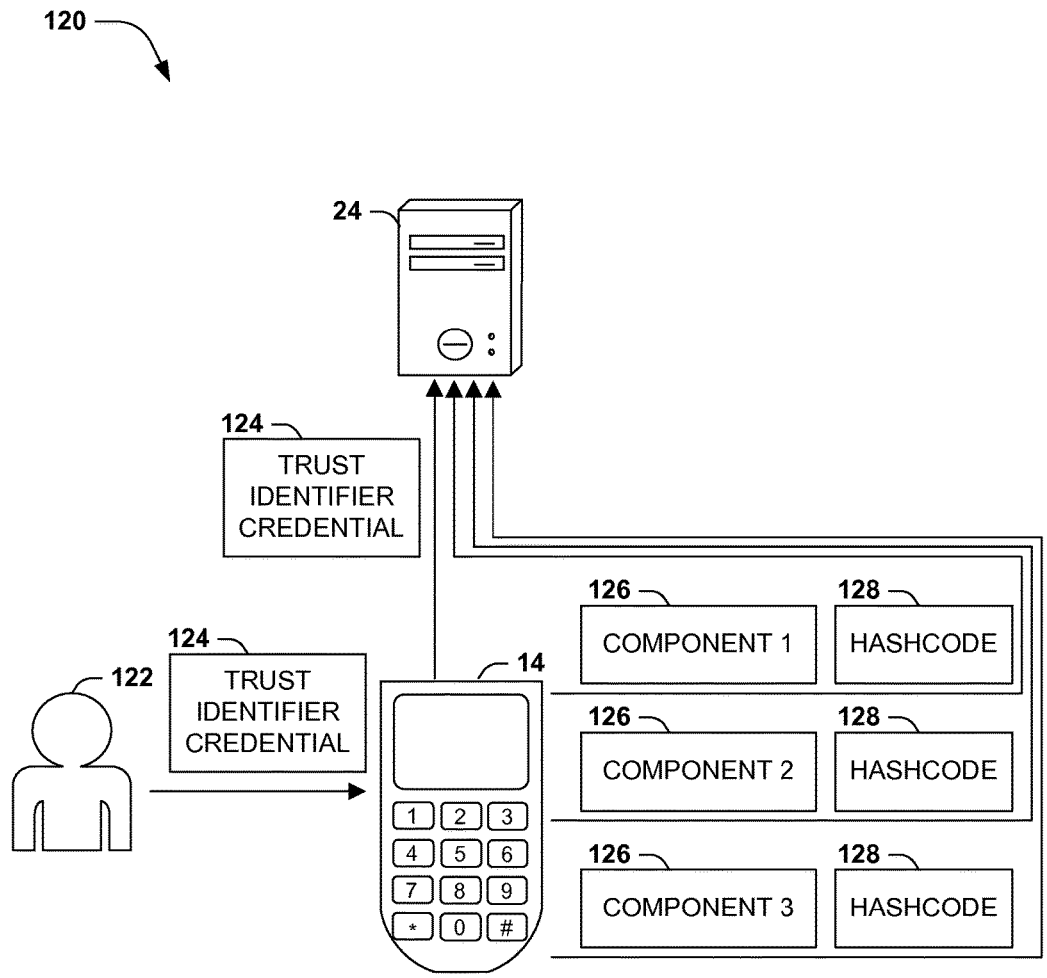
FIG. 6 is an illustration of an exemplary scenario featuring a verification of various trust identifiers of a device.

FIG. 6 presents an exemplary scenario 120 featuring the use of various trust identifiers 32 that may be submitted by a device 14 and used by the server 24 to verify the trust of the device 14. In this exemplary scenario 120, an owner of a device 14 may generate and provide to the device 14 a trust identifier credential 124, such as a cryptographically signed verification that the device 14 has been assigned a particular trust level that may be adequate to access particular objects 12. The device 14 may store the trust identifier credential 124 and may submit the trust identifier credential 124 to the server 24 with a request to access an object 12, and the server 24 may examine the trust identifier credential 124 (and identify the device integrity thereof, e.g., by verifying the cryptographic signature of the trust identifier credential 124 against a public key of the owner 122) in order to verify the trust identifier 32 of the device 14.

As further illustrated in the exemplary scenario 120 of FIG. 6, the device 14 comprises a set of device components 126, such as hardware devices and/or software modules (e.g., a firmware component, an operating system component, or a software library). The device 14 may also be configured to test each device component 126 and to generate a component integrity credential representing the contents and/or configuration of the device component 126, such as a hashcode 128 generated from the encoded instructions comprising a software module. The server 24 may also store a set of verified component integrity credentials (e.g., hashcodes 128) for trusted software modules. The device 14 may therefore assert the device integrity of the device 14 by computing a hashcode 128 (or other signature) for each device component 126 and sending such hashcodes 128 to the server 24, which may verify the device integrity of the device 14 by comparison with corresponding verified component integrity credentials (e.g., the set of hashcodes 128 of trusted software modules). This comparison may indicate whether any software modules have been altered in unauthorized or untrusted ways, and the server 24 may verify the trust identifier 32 of the device 14 according to this comparison. In this manner, the device 14 may utilize (alternatively or additionally) different types of trust identifiers 32 to assert the trust level of the device 14 to the server 24. Those of ordinary skill in the art may devise many ways of verifying the trust identifier 32 of the device 14 while implementing the techniques presented herein.

A fourth aspect that may vary among embodiments of these techniques relates to the generation and use of tickets 34 to grant access to respective keys 22. As a first example, a ticket 34 may specify one or more keys 22 that are authorized for access by the device 14 and/or the user 16. Alternatively, the ticket 34 may simply identify the verified trust identifier 32 of the device 14 and/or the authenticated identity of the user 16, and the server 24 may, upon receiving a ticket 34 and a request to access a key 22, verify that the previously verified trust identifier 32 of the device 14 and the previously authenticated identity of the user 16 are authorized to access the objects 12 encrypted with the key 22.

As a second example of this fourth aspect, a ticket 34 generated by the server 24 may be indefinitely valid. Alternatively, it may be advantageous to include one or more restrictions in tickets 34 generated by a server 24. As a first such variation, a ticket 34 may specify a duration within which the ticket 34 is valid, such as a few minutes, an hour, a day, or a week following the generation of the ticket 34. When the ticket 34 expires, the device 14 may be configured to discard the ticket 34. Alternatively, the device 14 may simply submit the ticket 34 to the server 24, and the server 24 may be configured to verify the validity of the ticket 34 according to the duration or other restrictions. Other restrictions may also be specified in a ticket 34. As a second such variation, if the device 14 comprises a device identifier, the ticket 34 may specify one or more device identifiers of devices 14 to which the ticket 34 is issued, and the server 24 may be configured to, while verifying the ticket, receive at least one device identifier of the device 14 and verify that the ticket 34 specifies the at least one device identifier of the device 14. This restriction may be advantageous, e.g., for restricting a transfer of a ticket 34 from a first device 14 that is authorized to access the object 12 to a second device 14 that may not be authorized to access the object 12. As a third such variation, a ticket 34 may be valid only for a limited number and/or types of uses (e.g., only for one access of a key 22, and/or only to access a key 22 that permits a read of an object 12 but that does not permit a write access of the object 12). For example, a ticket 34 may comprise a one-time use, such that a device 14 may be configured to, upon decrypting an encrypted object 20 with a key 22 obtained using a particular ticket 34, discard the ticket 34.

As a third example of this fourth aspect, the server 24 and/or device 16 may be configured to participate in the reexamination and/or reissue of expired tickets 34. As a first such variation, the device 16 may (periodically or upon use) examine stored tickets 34 to verify continued validity, and may discard any tickets 34 that are no longer valid. Alternatively, upon decrypting an encrypted object 20 with a key 22, the device 16 may re-verify that the ticket 34 is valid, and if not, may discard the key 22 and/or the unencrypted object 12. Alternatively or additionally, the device 16 may proactively seek the renewal of expired tickets 34 by resubmitting credentials 26 authenticating the user 16 and trust identifiers 32 of the device 16 to the server 24, and receiving from the server 24 and storing a renewed ticket 34.

As a second variation of this third example of this fourth aspect, the server 24 may examine all tickets 34 upon submission, and if a ticket 34 is no longer valid, the server 24 may endeavor to re-authenticate the user 16 and/or to re-verify the trust identifier 32 of the device 14. This re-authentication and re-verification may also be advantageous, e.g., for confirming that the device 14 and/or user 16 are still authorized to access the object 12 and/or key 22, and/or for enabling an owner 122 of the device 14 to revoke access by the device 14 and/or user 16 to one or more objects 12. If successful, may generate a renewed ticket 34 and may reissue the renewed ticket 34 to the device 14. Thus, it may be appreciated that a longer duration may reduce the frequency with which the re-authentication and re-verification are performed, but a shorter duration may increase the rapidity with which a revocation of access privileges is effectively instituted (e.g., by decreasing the period between when access is revoked and when a previously issued ticket 34 is reexamined for reissue that is denied due to the revocation).

A fifth aspect that may vary among embodiments of these techniques relates to the storage of objects 12 (and corresponding encrypted objects 20) by the device 14. As a first example, a device 14 may, upon decrypting an encrypted object 20 to generate an unencrypted object 12, simply store the unencrypted object 12 for indefinite and unregulated access. However, it may be advantageous to configure the device 14 restrict access to the unencrypted object 12, e.g., to achieve a conformity of the permission to access the object 12 according to the validity of a ticket 34. As one such example, the device 12 may comprise a secured data store, such as a separate portion of a storage component (e.g., a persistent or volatile memory circuit or a persistent storage volume) that is not freely allocated or accessible in the manner of unsecured data storage, but that is only accessible to applications in accordance with a ticket 34 stored by the device 14. For example, upon receiving a key 22, the device 14 may automatically store the key 22 in the secured data store, and/or, upon generating an unencrypted object 12 with the key 22, store the unencrypted object 12 in the secured data store (instead of simply providing the key 22 and/or the unencrypted object 12 to the user 16 and/or the requesting application). Upon receiving a request (from the user 16 or an application executing on the device 14) to perform an operation on the object 12, the device 14 may first verify that the ticket 34 granting access to the key 22 used to decrypt the object 12 remains valid.

As a second example of this fifth aspect, the device 14 and/or server 24 may be configured to secure one or more objects 12 stored by the device 14 in the event of an unauthorized access attempt (e.g., a theft or security compromise of the device 14 an attempt to impersonate the individual 16 or to forge the trust identifiers 32 of the device 14; or an attempt to access the server 24). For example, the device 14 and/or server 24 may be configured to monitor for unauthorized access attempts with respect to one or more objects 12 (e.g., a successful or unsuccessful attempt by an unauthorized user 16 and/or application to access an unencrypted object 12, encrypted object 20, or key 22 stored on the device 14). In the event of an unauthorized access attempt, the device 14 and/or server 24 may be configured to restore or reassert security over the object(s) 12. As a first such variation, the device 14 may, upon detecting the unauthorized access attempt, discard any tickets 34, keys 22, and/or unencrypted objects 12 associated with the object 12, and/or may report the unauthorized access attempt to the server 24. As a second such variation, when the server 24 detects the unauthorized access attempt relating to an object 12 that is stored on the device 14 as a first encrypted object 20 (encrypted using a first key 22), the server 24 may generate a second key 22; using the object 12 and the second key 22, may generate a second encrypted object 20; and may send the second encrypted object 20 to the device 14 to replace the first encrypted object 20. The device 14 may be configured to receive the second encrypted object 20 from the server 24, and may replace the first encrypted object 20 in the data store 18 with the second encrypted object 20. In this manner, keys 22 may be automatically and rapidly "rolled" in the event of a security breach in order to obstruct an intruder from accessing an object 12 for which security may have been compromised.

Figure 7:
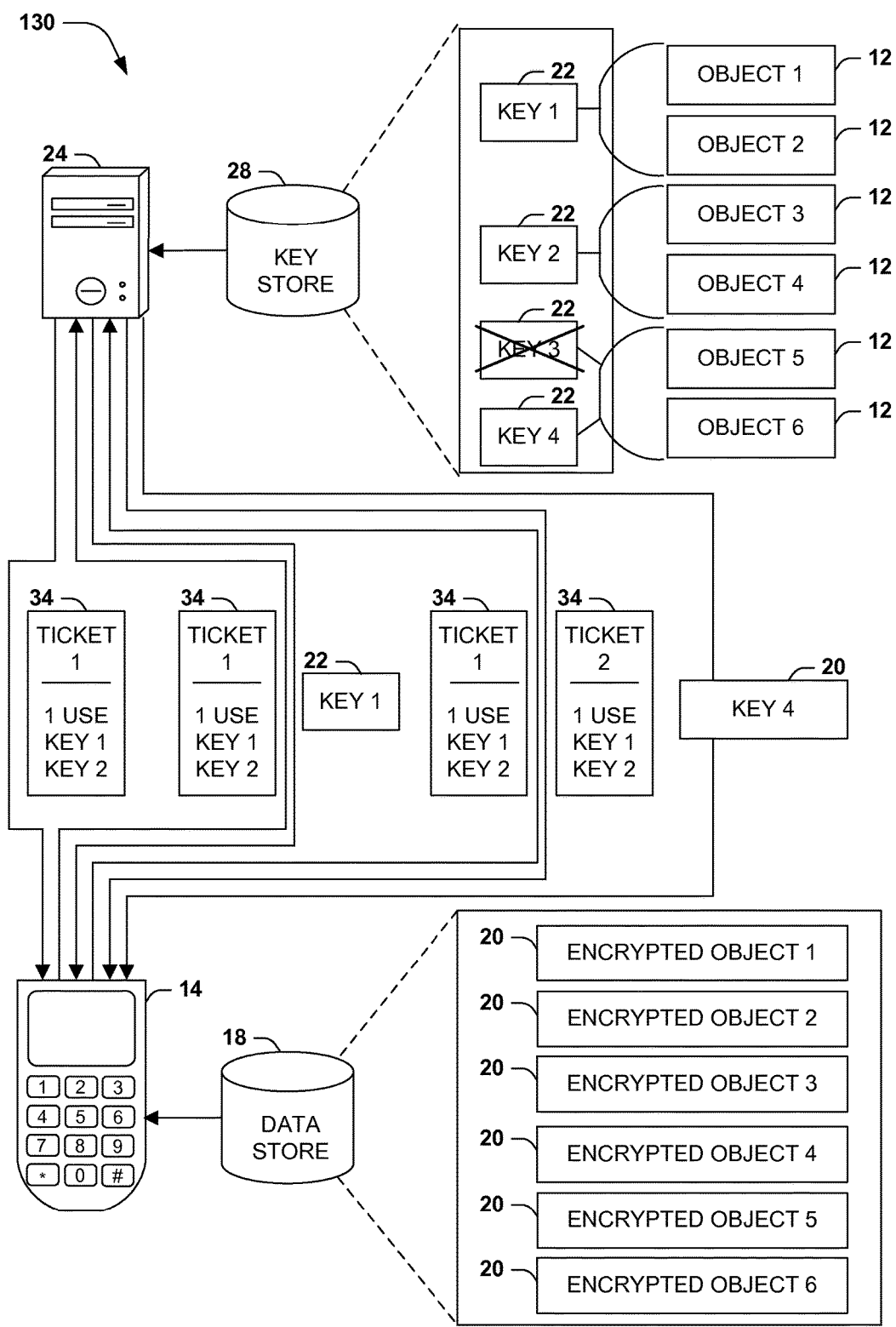
FIG. 7 is an illustration of an exemplary scenario featuring various types and uses of tickets generated by a server to grant access by a device to one or more objects.

FIG. 7 presents an illustration of an exemplary scenario 130 featuring some variations related to the generation and use of tickets 34 and the storage of objects 12 on a device 14. In this exemplary scenario 130, a server 24 comprises a key store 28 storing a set of keys 22 with which at least one object 12 has been encrypted, such as a first key 22 associated with a first object 12 and a second object 12, a second key 22 associated with a third object 12 and a fourth object 12, and a third key 22 associated with a fifth object 12 and a sixth object 12. The device 14 also comprises a data store 14 that stores encrypted objects 20 corresponding to each object 12 that has been encrypted with a key 22 in the key store 28 of the server 24. In accordance with the techniques presented herein, when a user 16 requests to access the first object 12, the device 14 may submit one or more credentials 26 authenticating the user 16 and one or more trust identifiers 32 verifying the trust (e.g., delegated access authorization and/or device integrity) of the device 14; and upon authenticating the credential(s) 26 of the user 16 and verifying the trust identifier(s) 32 of the device 14, the server 24 may issue a ticket 34 to the device 14. In this exemplary scenario 130, the ticket 34 grants access to the first key 22 and the second key 22 (but not to the third key 22), but is restricted to only one request. For example, when the device 14 submits the ticket 34 to request the first key 22, the server 24 may verify the ticket 34 and may send the first key 22 to the device 14. However, when the device 14 submits the ticket 34 to request the second key 22, the server may identify that the ticket 34 has expired, and may, upon re-authenticating the credential(s) 26 of the user 16 and the trust identifier(s) 32 of the device 14, reissue a second, renewed ticket 34 to the device 14.

As additionally illustrated in the exemplary scenario 130 of FIG. 7, the server 24 and device 14 are configured to respond to unauthorized access attempts in order to maintain security over the objects 12. For example, the device 14 and/or server 24 may detect that the third key 22 may have been compromised. Accordingly, the server 24 may request the device 14 to generate a fourth key 22 and to generate new encrypted objects 20 with the fourth key 22 for the objects 12 encrypted with the third key 22. For example, the device 14 may generate a fourth key 22, may decrypt the fifth object 12 and the sixth object 12 with the third key 22, and may re-encrypt the fifth object 12 and the sixth object 12 with the fourth key 22. The device 14 may then replace the first encrypted versions of the fifth object 12 and the sixth object 12 with the versions encrypted with the fourth key 22. The device 14 may also send the fourth key 22 to the server 24, which may replace the third key 22 in the key store 28 with the fourth key 22. This automatic "rolling" of the key 22 and reestablishment of security over the objects 12 associated with the potentially compromised third key 22 may enable a rapid and automated response to ad detected security breach. Those of ordinary skill in the art may devise many such variations in the generation and use of tickets 34 and/or the storage of objects 12 on the device 14 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
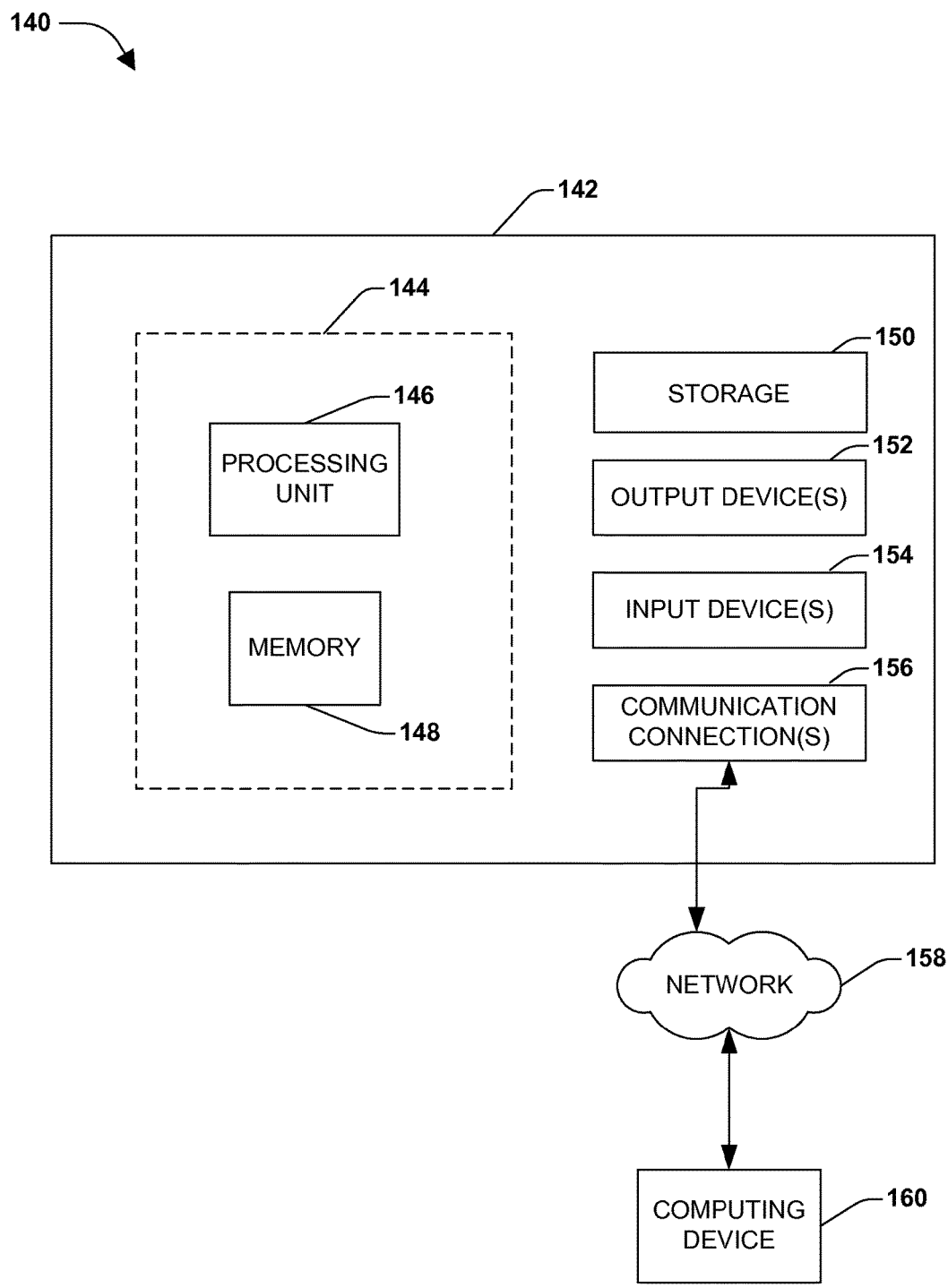
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 140 comprising a computing device 142 configured to implement one or more embodiments provided herein. In one configuration, computing device 142 includes at least one processing unit 146 and memory 148. Depending on the exact configuration and type of computing device, memory 148 may be volatile (such as RAM, for example), non-volatile (such as ROM, flash memory, etc., for example) or some combination of the two. This configuration is illustrated in FIG. 8 by dashed line 144.

In other embodiments, device 142 may include additional features and/or functionality. For example, device 142 may also include additional storage (e.g., removable and/or non-removable) including, but not limited to, magnetic storage, optical storage, and the like. Such additional storage is illustrated in FIG. 8 by storage 150. In one embodiment, computer readable instructions to implement one or more embodiments provided herein may be in storage 150. Storage 150 may also store other computer readable instructions to implement an operating system, an application program, and the like. Computer readable instructions may be loaded in memory 148 for execution by processing unit 146, for example.

The term "computer readable media" as used herein includes computer storage media. Computer storage media includes volatile and nonvolatile, removable and non-removable media implemented in any method or technology for storage of information such as computer readable instructions or other data. Memory 148 and storage 150 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 142. Any such computer storage media may be part of device 142.

Device 142 may also include communication connection(s) 156 that allows device 142 to communicate with other devices. Communication connection(s) 156 may include, but is not limited to, a modem, a Network Interface Card (NIC), an integrated network interface, a radio frequency transmitter/receiver, an infrared port, a USB connection, or other interfaces for connecting computing device 142 to other computing devices. Communication connection(s) 156 may include a wired connection or a wireless connection. Communication connection(s) 156 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 142 may include input device(s) 154 such as keyboard, mouse, pen, voice input device, touch input device, infrared cameras, video input devices, and/or any other input device. Output device(s) 152 such as one or more displays, speakers, printers, and/or any other output device may also be included in device 142. Input device(s) 154 and output device(s) 152 may be connected to device 142 via a wired connection, wireless connection, or any combination thereof. In one embodiment, an input device or an output device from another computing device may be used as input device(s) 154 or output device(s) 152 for computing device 142.

Components of computing device 142 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 142 may be interconnected by a network. For example, memory 148 may be comprised of multiple physical memory units located in different physical locations interconnected by a network.

Those skilled in the art will realize that storage devices utilized to store computer readable instructions may be distributed across a network. For example, a computing device 160 accessible via network 158 may store computer readable instructions to implement one or more embodiments provided herein. Computing device 142 may access computing device 160 and download a part or all of the computer readable instructions for execution. Alternatively, computing device 142 may download pieces of the computer readable instructions, as needed, or some instructions may be executed at computing device 142 and some at computing device 160.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of regulating access, by a server having a processor and a key store that stores a key, to an object encrypted with the key and stored on a device operated by a user, the method comprising:
   executing, on the processor, instructions that cause the server to:
      receive a request of a user to establish an assignment, to a particular device of a user, of an access privilege authorizing the particular device to access the object;
      store a record of the assignment of the access privilege to the particular device of the user of the access privilege to access the object;
      receive a request from the particular device to access the key;
      verify that the access privilege requested by the user authorizes the particular device to access the object; and
      responsive to verifying the access privilege:
         generate a ticket granting access to the key and indicating the access privilege assigned to the particular device for access to the object, and
         send the ticket to the particular device; and
      responsive to receiving the ticket from the particular device:
         verify the ticket, and
         responsive to verifying the ticket, send the key to the particular device.

2. The method of claim 1:
   the server configured to store at least one credential of the user; and
   wherein the instructions further cause the server to authenticate the user by:
      receiving a submitted credential from the user, and
      comparing the submitted credential with the at least one credential of the user.

3. The method of claim 2, at least one credential of the user selected from a credential set comprising:
   a secret known by the user;
   a token possessed by the user;
   a contact identifier whereby the user may be contacted; and
   a biometric identifier identifying at least one physiological feature of the user.

4. The method of claim 1, comprising:
   generating the key, and
   instructing the device to encrypt at least one object with the key.

5. The method of claim 1, comprising: receiving from the device a key generated by the device and with which at least one object has been encrypted.

6. The method of claim 1, wherein:
the access privilege further specifies a component identifier establishing a component integrity of at least one component of the device; and
verifying the access specifically by the device to the object further comprising: verifying the component identifier establishing the component integrity of the at least one component of the device.

7. The method of claim 1:
the ticket having a duration; and
verifying the ticket comprising: verifying the duration of the ticket.

8. The method of claim 1:
the device having at least one device identifier;
the ticket specifying at least one device identifier of the device to which the ticket is issued; and
verifying the ticket comprising:
receiving at least one device identifier of the device, and
verifying that the ticket specifies at least one device identifier received from the device.

9. The method of claim 1, wherein executing the instructions further causes the server to, responsive to failing to identify the ticket received from the device:
re-authenticate the user;
re-verify that the access privilege establishes that the device is authorized to access the object; and
responsive to re-authenticating the user and re-verifying the access privilege:
generate a renewed ticket granting access to the key, and
send the renewed ticket to the device.

10. The method of claim 1, wherein executing the instructions further causes the server to, responsive to detecting an unauthorized access attempt relating to the object:
send to the device a request to encrypt the object with a second key; and
responsive to receiving the second key from the device, replace the first key in the key store with the second key.

11. A method of accessing objects on a device operated by a user and having a processor and a data store using a server having a key store, the method comprising:
executing on the processor instructions that cause the device to:
receive a key;
encrypt at least one object with the key to generate an encrypted object;
store the encrypted object in the data store;
send the key to the server;
responsive to a request to access the object:
submit to the server:
at least one credential authenticating the user, and an identifier device identifier of the device; and
receiving a ticket from the server indicating an access privilege that has been assigned particularly to the device for accessing the object responsive to a request of the user of the device to establish an assignment of an access privilege, particular to the device, to authorize the device to access the object;
sending the ticket to the server; and
responsive to receiving a key from the server:
decrypting the encrypted object with the key to generate an unencrypted object, and
presenting the unencrypted object in response to the request.

12. The method of claim 11, receiving the key comprising: receiving the key from the server.

13. The method of claim 11:
the device comprising a biometric sensor configured to detect at least one biometric identifier of a user;
the at least one credential authenticating the user comprising a biometric identifier stored by the server and representing the user; and
submitting the at least one credential authenticating the user to the server comprising:
using the biometric sensor, detecting at least one biometric of the user, and
submitting the at last one biometric to the server for comparison with a corresponding biometric identifier of the user.

14. The method of claim 11:
the device configured to test at least one device component of the device to generate a component integrity credential identifying a component integrity of the device component;
the access privilege assigned to the device further comprising a verified component integrity credential of the device stored by the server and representing a component integrity of the device component; and
submitting the access request of the device to the server comprising:
detecting at least one component integrity credential of at least one device component, and
submitting the at least one component integrity credential to the server for comparison with a corresponding verified component integrity credential.

15. The method of claim 11:
the device comprising a secured data store; and
wherein executing the instructions further causes the device to:
responsive to receiving a key, store the key in the secured data store;
responsive to generating the unencrypted object, store the unencrypted object in the secured data store; and
responsive to receiving a request to perform an operation on the object:
verify the ticket, and
responsive to verifying the ticket, perform the operation on the object.

16. The method of claim 11, the instructions configured to, after decrypting an encrypted object:
re-verify the ticket, and
responsive to failing to re-verify the ticket:
discard the key, and
discard the unencrypted object.

17. The method of claim 16, wherein executing the instructions further causes the device to, responsive to failing to re-verify the ticket:
resubmit at least one credential authenticating the user to the server, and
receive a renewed ticket from the server.

18. The method of claim 11, wherein executing the instructions further causes the device to, responsive to detecting an unauthorized access attempt related to an object:
discard tickets, keys, and unencrypted objects associated with the object, and
report the unauthorized access attempt to the server.

19. The method of claim 11, wherein executing the instructions further causes the device to, responsive to receiving from the server a request to encrypt the object with a second key:

generate a second key;
decrypt the object using the key;
encrypt the object using the second key to generate a second encrypted object;
store the second encrypted object in the data store; and
send the second key to the server.

20. A server that regulates access to an object encrypted with a key, the server comprising:
a processor; and
a memory storing:
   a key store for the key; and
   instructions that, when executed by the processor, cause the server to fulfill a request from a device of a user to access the key, wherein the request includes a trust identifier establishing that the user has authorized the device to access the object by:
      receiving a request of a user to establish an assignment, to a particular device of the user, of an access privilege authorizing the particular device to access the object;
      storing a record of the assignment of the access privilege to the particular device of the user of the access privilege to access the object;
      verifying that the access privilege requested by the user authorizes the particular device to access the object;
      responsive to verifying the access privilege:
         generating a ticket granting access to the key and indicating the access privilege requested by the user for the particular device to access to the object, and
         sending the ticket to the device; and
      responsive to receiving the ticket from the device:
         verifying the ticket, and
         responsive to verifying the ticket, sending the key to the particular device.

\* \* \* \* \*